Aug. 26, 1958    H. F. W. MARUHN    2,849,226
MAIN SPRING FOR MOTOR VEHICLES
Filed July 5, 1955
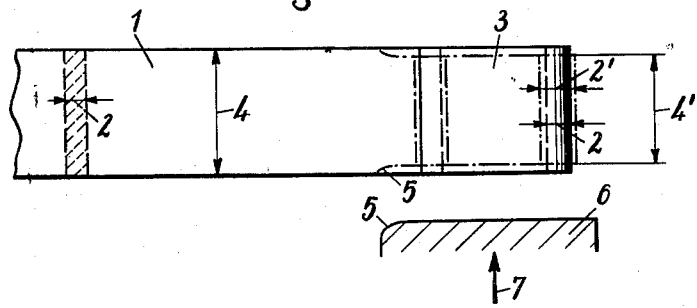
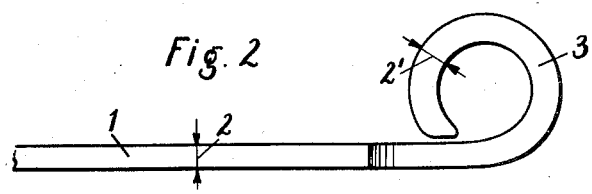
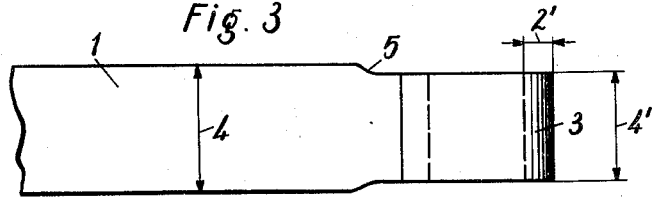
INVENTOR
HERBERT F. W. MARUHN
BY Dicke and Craig
ATTORNEYS

2,849,226
Patented Aug. 26, 1958

2,849,226

MAIN SPRING FOR MOTOR VEHICLES

Herbert F. W. Maruhn, Stuttgart-Uhlbach, Germany, assignor to Daimler-Benz Aktiengesellschaft, Stuttgart-Unterturkheim, Germany Application July 5, 1955, Serial No. 519,989

Claims priority, application Germany July 3, 1954

3 Claims. (Cl. 267—47)

The present invention relates to new and useful improvements in leaf springs, and especially the main spring leaf for motor vehicles, in which the leaf strength at the eyes of the spring is greater than at the main part of the spring.

In view of the unitary assembly of the entire main spring, the strength of the main leaf thereof depends to a considerable extent upon the strength of the other leaves cooperating therewith. It has now been found that the main leaves easily break at or near the point where the curvature of the bent-up spring eyes begins, and that such breakage is primarily due to the fact that the spring eye is subjected to additional stresses caused by horizontal forces which are produced, for example, when applying the brakes of the car or truck or when driving the same at considerable speed over a bumpy road. Such breakage occurs especially if the center of the spring eyes is disposed outside of the central longitudinal plane of the main leaf. The horizontal forces acting upon the spring tend to unbend or break the spring eyes.

Prior to this invention, such breakage was avoided by making the entire main spring leaf of greater strength sufficient to prevent such breakage and by then milling-down the spring leaf intermediate the spring eyes to a leaf strength which corresponds to that of the other leaves which are to be combined with the main leaf to form the entire spring assembly. Considering the great length of such main spring leaves which for example, in omnibuses, amounts to as much as about 60 inches, it will be evident that such work of milling off the material of the spring leaf intermediate the spring eyes required considerable time and effort.

It is an object of the present invention to provide a method of making a main leaf for the main spring assembly of a motor vehicle which reduces the amount of labor and material required therfor to a minimum.

In order to accomplish this object, the invention provides for shaping the main spring leaf so that the eye portion will be stronger than the central part thereof by applying a procedure which, despite its relative simplicity, has previously not been considered for that purpose. This procedure consists in upsetting the readily bent spring eyes, preferably from both sides and the axial direction thereof.

Such upsetting or thickening of the spring eyes may be carried out by relatively simple tools and at a low expense in labor, and without any structural changes of the material.

Further objects, features, and advantages of the present invention will be apparent from the following detailed description thereof, as well as from the accompanying drawings, in which Fig. 1 illustrates the upsetting of the sides of a spring eye of a main spring leaf, and also shows diagrammatically a portion of the upsetting tool;

Fig. 2 shows a side view of one end of a main leaf provided with a strengthened eye portion according to the invention; while Fig. 3 shows a plan view of the spring as shown in Fig. 2.

Referring to the drawings, the main spring leaf 1, as shown in Fig. 1, has originally the same thickness 2 and width 4 throughout its length. By means of a suitable upsetting tool 6, the leaf strength 2 may be increased at the eye portion 3 so as to obtain a thickness 2', while at the same time, the width 4 of such eye portion 3 will be reduced from both sides to a width 4'. The upsetting tool 6 is preferably shaped so as to form a gradual merger 5 of the main part of the leaf spring 1 with the eye portion 3, and it is preferably applied upon both sides of the eye portion 3 in the axial direction thereof.

After such upsetting, the spring eye 3 may be finished along the inside, as well as along its faces, for example, for the purpose of providing it with a threaded sleeve or bushing for receiving the spring bolt.

As illustrated in Figs. 2 and 3, spring leaf 1 then has a uniform thickness intermediate the eye portions 3, while at a point near the eyes as such, that is, beginning approximately at the point 5 where the width 4 of the leaf is gradually reduced to the narrower width 4' so as to permit the mounting of the spring suspension element, the thickness of the material gradually increases so as to assume its greatest thickness 2' at the spring eye 3 proper.

While I have described my invention with reference to the preferred embodiment thereof, I wish to have it understood that it is in no way limited to the detail of such embodiment, but is capable of numerous modifications within the scope of the appended claims.

Having thus fully disclosed my invention, what I claim is:

1. A method of producing a main spring leaf for a leaf spring assembly comprising the steps of bending the end portions of said leaf so as to form spring eyes, and of then laterally compressing the material substantially within the area of said eye portions so as to increase the thickness of the material substantially within said area.

2. A method of producing a main spring leaf for a leaf spring assembly comprising the step of bending the end portions of said leaf so as to form spring eyes, and of then upsetting the material from both sides thereof substantially within the area of said eye portions in a gradual manner in the axial direction thereof so as to increase the thickness of the material substantially within said area of said eye portions.

3. A main spring leaf for a leaf spring assembly comprising a main central part and two intermediate parts, said intermediate parts being integrally joined with said central part by portions of varying width, said intermediate parts being of less width than said central part and being of a thickness greater than said central part, the thickness of said intermediate parts increasing in directions leading away from said central part, curved portions integral with said intermediate parts and forming eyes, said curved portions having a thickness greater than the greatest thickness of said intermediate parts.

References Cited in the file of this patent

UNITED STATES PATENTS 1,650,941    Hopkins _____ Nov. 29, 1927
1,959,027    Hemstreet _____ May 15, 1934

OTHER REFERENCES

"Laminated Springs" (Sanders), Locomotive Publishing Co. (London), 1923.